(12) United States Patent
Fumimoto et al.

(10) Patent No.: US 11,722,331 B2
(45) Date of Patent: Aug. 8, 2023

(54) DEVICE MANAGEMENT SYSTEM

(71) Applicant: DAIKIN INDUSTRIES, LTD., Osaka (JP)

(72) Inventors: Takuya Fumimoto, Osaka (JP); Ryohei Okada, Osaka (JP); Yoshihide Nomura, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/614,155

(22) PCT Filed: Jun. 1, 2020

(86) PCT No.: PCT/JP2020/021612
§ 371 (c)(1),
(2) Date: Nov. 24, 2021

(87) PCT Pub. No.: WO2020/246426
PCT Pub. Date: Dec. 10, 2020

(65) Prior Publication Data
US 2022/0217009 A1    Jul. 7, 2022

(30) Foreign Application Priority Data

Jun. 7, 2019 (JP) .................................. 2019-106805

(51) Int. Cl.
*F24F 11/54* (2018.01)
*H04L 12/28* (2006.01)
(Continued)

(52) U.S. Cl.
CPC .......... *H04L 12/2816* (2013.01); *F24F 11/54* (2018.01); *F24F 11/56* (2018.01); *F24F 11/63* (2018.01)

(58) Field of Classification Search
CPC ........ H04L 12/2816; F24F 11/63; F24F 11/64
See application file for complete search history.

(56) References Cited

U.S. PATENT DOCUMENTS

2002/0029096 A1* 3/2002 Takai ....................... F24F 11/30
                                                                    700/276
2009/0231092 A1    9/2009 Maegawa et al.
(Continued)

FOREIGN PATENT DOCUMENTS

| JP | 2003-323211 A | 11/2003 |
| JP | 2009-224852 A | 10/2009 |

(Continued)

OTHER PUBLICATIONS

International Search Report of corresponding PCT Application No. PCT/JP2020/021612 dated Sep. 1, 2020.
(Continued)

*Primary Examiner* — Mohammad Ali
*Assistant Examiner* — Vincent W Chang
(74) *Attorney, Agent, or Firm* — Global IP Counselors, LLP (57) ABSTRACT

A device management system includes a storage unit and a processing unit. The device management system manages a device serving as a management target. The device is one or both of an outdoor unit and an indoor unit of an air conditioner. The storage unit stores data of the device as a device data model having a hierarchical structure in which information relating to a component of the device is associated with the device. The processing unit, in response to a processing request from an external program, reads or rewrites the data stored as the device data model in the storage unit.

14 Claims, 8 Drawing Sheets

(51) Int. Cl.
*F24F 11/63* (2018.01)
*F24F 11/56* (2018.01)

(56) References Cited

U.S. PATENT DOCUMENTS

| | | | | |
|---|---|---|---|---|
| 2011/0015802 | A1 | 1/2011 | Imes | |
| 2011/0145395 | A1* | 6/2011 | Kawai | H04Q 9/00 |
| | | | | 709/224 |
| 2015/0120003 | A1* | 4/2015 | Kobori | F24F 11/30 |
| | | | | 700/19 |
| 2015/0308702 | A1* | 10/2015 | Yabuta | F24F 11/63 |
| | | | | 700/276 |
| 2015/0308708 | A1* | 10/2015 | Harada | G06Q 20/085 |
| | | | | 700/276 |
| 2016/0314180 | A1* | 10/2016 | Puhak | G06F 16/26 |
| 2016/0327921 | A1* | 11/2016 | Ribbich | F24F 11/70 |
| 2017/0038086 | A1* | 2/2017 | Nabeshima | F24F 11/62 |
| 2017/0038087 | A1* | 2/2017 | Nabeshima | G05B 15/02 |
| 2018/0087796 | A1* | 3/2018 | Blair | F24F 11/30 |
| 2018/0259209 | A1 | 9/2018 | Przybylski | |
| 2018/0367331 | A1* | 12/2018 | Wang | H04L 12/282 |
| 2019/0049138 | A1 | 2/2019 | Matsumoto et al. | |
| 2019/0094827 | A1 | 3/2019 | Park et al. | |

FOREIGN PATENT DOCUMENTS

| | | |
|---|---|---|
| JP | 2014-194309 A | 10/2014 |
| JP | 6160789 B1 | 6/2017 |
| JP | 2018-151095 A | 9/2018 |
| WO | 2015/008361 A1 | 1/2015 |

OTHER PUBLICATIONS

International Preliminary Report of corresponding PCT Application No. PCT/JP2020/021612 dated Dec. 16, 2021.
European Search Report of corresponding EP Application No. 20 818 344.2 dated Jun. 22, 2022.

* cited by examiner

DEVICE MANAGEMENT SYSTEM

CROSS-REFERENCE TO RELATED APPLICATIONS

This U.S. National stage application claims priority under 35 U.S.C. § 119(a) to Japanese Patent Application No. 2019-106805, filed in Japan on Jun. 7, 2019, the entire contents of which are hereby incorporated herein by reference.

BACKGROUND

Field of the Invention

A device management system that manages devices

Background Information

In the related art, there are device management systems that manage devices such as outdoor units and indoor units of air conditioners. For example, a device management system presented in Japanese Patent No. 6160789 includes a management apparatus connected to a device via a communication network. A participant terminal that issues a processing request relating to monitoring or an operation of the device is connected to the management apparatus.

SUMMARY

The management apparatus acquires various pieces of data from the device serving as a management target and stores the various pieces of data as a device data model. The device data model has a structure in which all the pieces of data are arranged at an equal level directly under the device. The participant terminal has a program for issuing, to the management apparatus, a processing request relating to monitoring or an operation of the device. When the program is executed in the participant terminal, in response to the processing request from the participant terminal (external program), the management apparatus performs processing of reading a piece of data of the device or processing of rewriting a piece of data of the device. In this manner, the device management system can monitor or operate the device.

However, as described above, the device data model handled by the device management system has a structure in which all the pieces of data of the device are arranged at an equal level directly under the device. Thus, when accessing a piece of data in response to the processing request from the program, the management apparatus needs to search all the pieces of data and thus takes some time to access the desired piece of data.

A device management system according to a first aspect is a device management system that manages a device serving as a management target and that includes a storage unit and a processing unit. The storage unit stores data of the device as a device data model having a hierarchical structure in which at least one of information relating to a component of the device, information relating to a function of the device, and information relating to a specification of the device is associated with the device. In response to a processing request from an external program, the processing unit reads or rewrites the data stored as the device data model in the storage unit.

The device management system according to the first aspect employs the above-described hierarchical structure as the device data model and thus can quickly access desired data when accessing the data in response to the processing request from the external program.

A device management system according to a second aspect is the device management system according to the first aspect in which the device data model includes, as a layer associated with the device, at least one of a component entity, a function entity, and a specification entity. The component entity is an entity based on the information relating to the component of the device. The function entity is an entity based on the information relating to the function of the device. The specification entity is an entity based on the information relating to the specification of the device.

A device management system according to a third aspect is the device management system according to the second aspect in which the device data model includes the component entity as the layer associated with the device. For each of the components, the component entity is associated with at least one of information relating to a state of the component and information relating to control of the component.

A device management system according to a fourth aspect is the device management system according to the third aspect in which in a case where the device includes a sensor for use in common in control of a plurality of the components, information relating to the sensor is treated as information relating to an independent component including the sensor. That is, the information relating to the sensor is not associated with each of the components in the component entity but another independent component including the sensor is defined.

A device management system according to a fifth aspect is the device management system according to the third or fourth aspect in which for each of the components, the component entity is associated with information indicating a relationship between the components.

A device management system according to a sixth aspect is the device management system according to the second aspect in which the device data model includes the function entity as the layer associated with the device. The function entity is associated with at least one of information relating to an operation of the device, information relating to control of the device, and information relating to environment information measured by the device.

A device management system according to a seventh aspect is the device management system according to the sixth aspect in which the function entity has the information relating to the operation of the device at an identical hierarchical level irrespective of a type of the device.

A device management system according to an eighth aspect is the device management system according to the second aspect in which the device data model includes the specification entity as the layer associated with the device. The specification entity is associated with at least one of information relating to unique information of the device, information relating to identification information of the device, and information relating to installation information of the device.

A device management system according to a ninth aspect is the device management system according to any of the first to eighth aspects in which the device data model defines a data type for each piece of data of the device. The data type includes a readable state value and a rewritable setting value. In a case where rewriting of the data having the state value alone as the data type is attempted in response to the processing request from the external program, the processing unit transmits, to the external program, information indicating that rewriting of the data is inappropriate.

The device management system according to the ninth aspect can inform the external program that there is a data type error in the processing request from the external program.

A device management system according to a tenth aspect is the device management system according to any of the first to eighth aspects in which the device data model defines a data type for each piece of data of the device. The data type includes a readable state value and a rewritable setting value. The processing unit transmits the rewritten setting value to the device in a case where the processing unit rewrites, in response to the processing request from the external program, the setting value of the data having the state value and the setting value as the data types. The processing unit transmits, to the external program, information indicating that the device has failed to operate in accordance with the setting value in a case where the processing unit does not receive the state value corresponding to the setting value from the device within a predetermined period since the transmission of the setting value to the device.

The device management system according to the tenth aspect can inform the external program that the device has failed to operate in accordance with the setting value.

A device management system according to an eleventh aspect is the device management system according to any of the first to tenth aspects in which the device data model defines attribute information for each piece of data of the device. In response to the processing request from the external program, the processing unit transmits, to the external program, information indicating whether the processing request conforms to the attribute information of the data for which the processing request is made.

The device management system according to the eleventh aspect can inform the external program whether the processing request from the external program conforms to the attribute information of the data.

DETAILED DESCRIPTION OF EMBODIMENT(S)

(1) Overall Configuration

Figure 1:
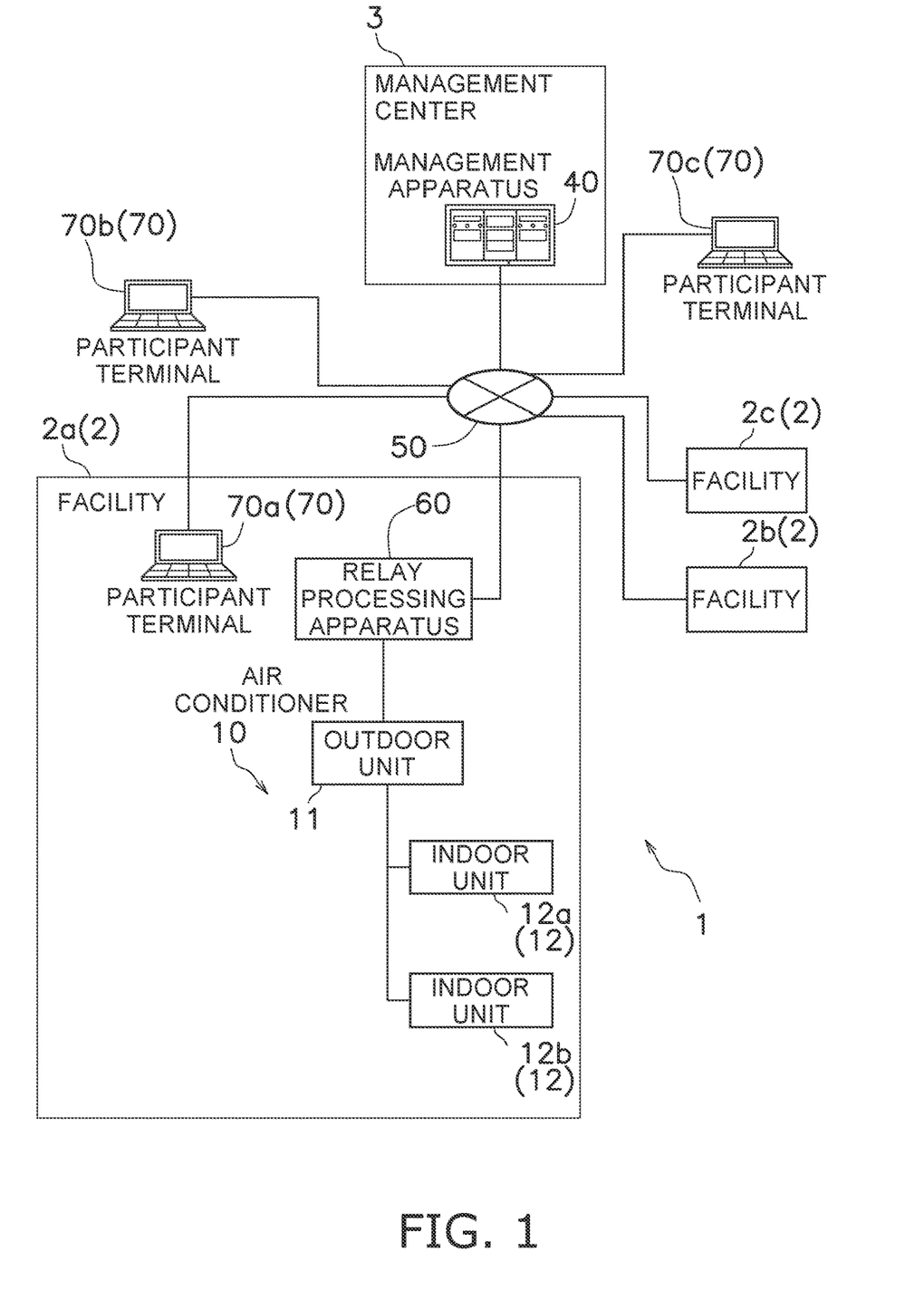
FIG. 1 is a schematic diagram illustrating a configuration of a device management system.

FIG. 1 is a schematic diagram illustrating a configuration of a device management system 1. In the description below, when a common description is given of a plurality of apparatuses having substantially the same functions, the description is given by using the same reference signs. When description is given of one apparatus among the plurality of apparatuses having substantially the same functions in a distinguished manner, the description is given by using a lower-case alphabet as an index. For example, indoor units 12a and 12b are apparatuses having substantially the same functions. When common description is given, the indoor units 12a and 12b are denoted as indoor units 12 by omitting the indices a and b.

The device management system 1 is a system in which a management apparatus 40 manages a plurality of devices. In this embodiment, the management apparatus 40 is installed at a central management center 3. The management apparatus 40 is connected to a communication network 50 such as Internet. A plurality of facilities 2 (2a to 2c) are present in a management area of the central management center 3. The facilities 2 are, for example, office buildings, commercial buildings and condominiums. In each of the facilities 2, one or a plurality of air conditioners 10 that perform cooling and heating in the facility 2 are installed as management targets. The air conditioner 10 includes an outdoor unit 11 and one or a plurality of indoor units 12 (12a, 12b). A relay processing apparatus 60 is connected to the air conditioner 10. The relay processing apparatus 60 is connected to the communication network 50 directly or via a router. The management apparatus 40 is connected to participant terminals 70 (70a to 70c) via the communication network 50. In the device management system 1, the management apparatus 40 and the relay processing apparatus 60 communicate data of the air conditioner 10 (the outdoor unit 11 and the indoor units 12) to each other, so that the air conditioner 10 is managed (monitored, operated, or the like). Specifically, in response to a processing request from the participant terminal 70, the management apparatus performs processing of reading data of the outdoor unit 11 and the indoor units 12 or processing of rewriting data of the outdoor unit 11 and the indoor units 12. The management apparatus 40 transmits the read data to the participant terminal 70 or transmits the rewritten data to the outdoor unit 11 and the indoor units 12 by rewriting data. The participant terminal 70 monitors the outdoor unit 11 and the indoor units 12 by using the data received from the management apparatus 40. The participant terminal 70 also transmits, to the outdoor unit 11 and the indoor units 12, (an instruction relating to) the data rewritten by the management apparatus 40 in response to the processing request (instruction) therefrom so as to operate the outdoor unit 11 and the indoor units 12. In this manner, the outdoor unit 11 and the indoor units 12 are managed (monitored, operated, or the like).

(2) Devices Serving as Management Targets

Figure 2:
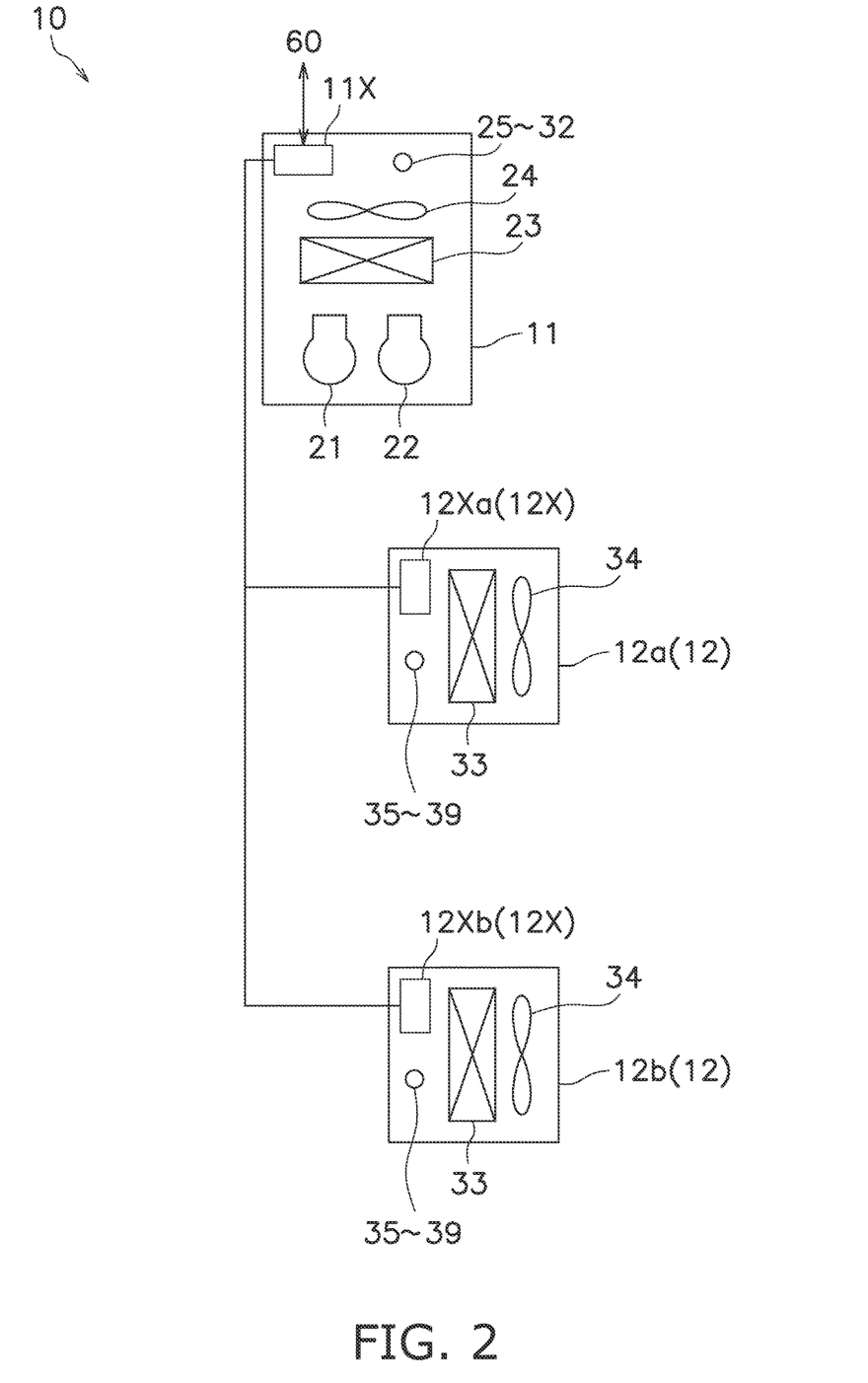
FIG. 2 is a schematic diagram illustrating a configuration of an air conditioner.

FIG. 2 is a schematic diagram illustrating a configuration of the air conditioner 10.

As described above, the air conditioner 10 that is a management target of the device management system 1 includes the outdoor unit 11 and the one or plurality of indoor units 12. The outdoor unit 11 is installed, for example, at a rooftop, a basement, or the like. The indoor units 12 are installed on a plurality of floors, in a plurality of rooms, or the like of the facility 2 in a distributed manner.

The outdoor unit 11 includes compressors 21 and 22, an outdoor heat exchanger 23, an outdoor fan 24, sensors 25 to 32, an outdoor-unit control unit 11X, and so on. Each of the indoor units 12a and 12b includes an indoor heat exchanger 33, an indoor fan 34, sensors 35 to 39, an indoor-unit control unit 12X (12Xa, 12Xb), and so on. The outdoor unit 11 (the outdoor-unit control unit 11X) and the indoor units 12 (the indoor-unit control units 12X) are connected to each other through a dedicated communication line. Based on detected values obtained by the sensors 25 to 32 and the sensors 35 to 39, the outdoor-unit control unit 11X and the indoor-unit control units 12X control operations of each unit of the air conditioner 10 in cooperation with each other. The outdoor-unit control unit 11X communicates data of the outdoor unit 11 and the indoor units 12 with the relay processing apparatus 60. The air conditioner 10 is operated on the basis of an instruction input to the control units 11X and 12X from a remote control or the like attached to the corresponding indoor unit 12 or an instruction input to the control units 11X and 12X from the participant terminal 70 via the communication network 50, the management apparatus 40, and the relay processing apparatus 60.

(3) Detailed Configuration of Device Management System

Figure 3:
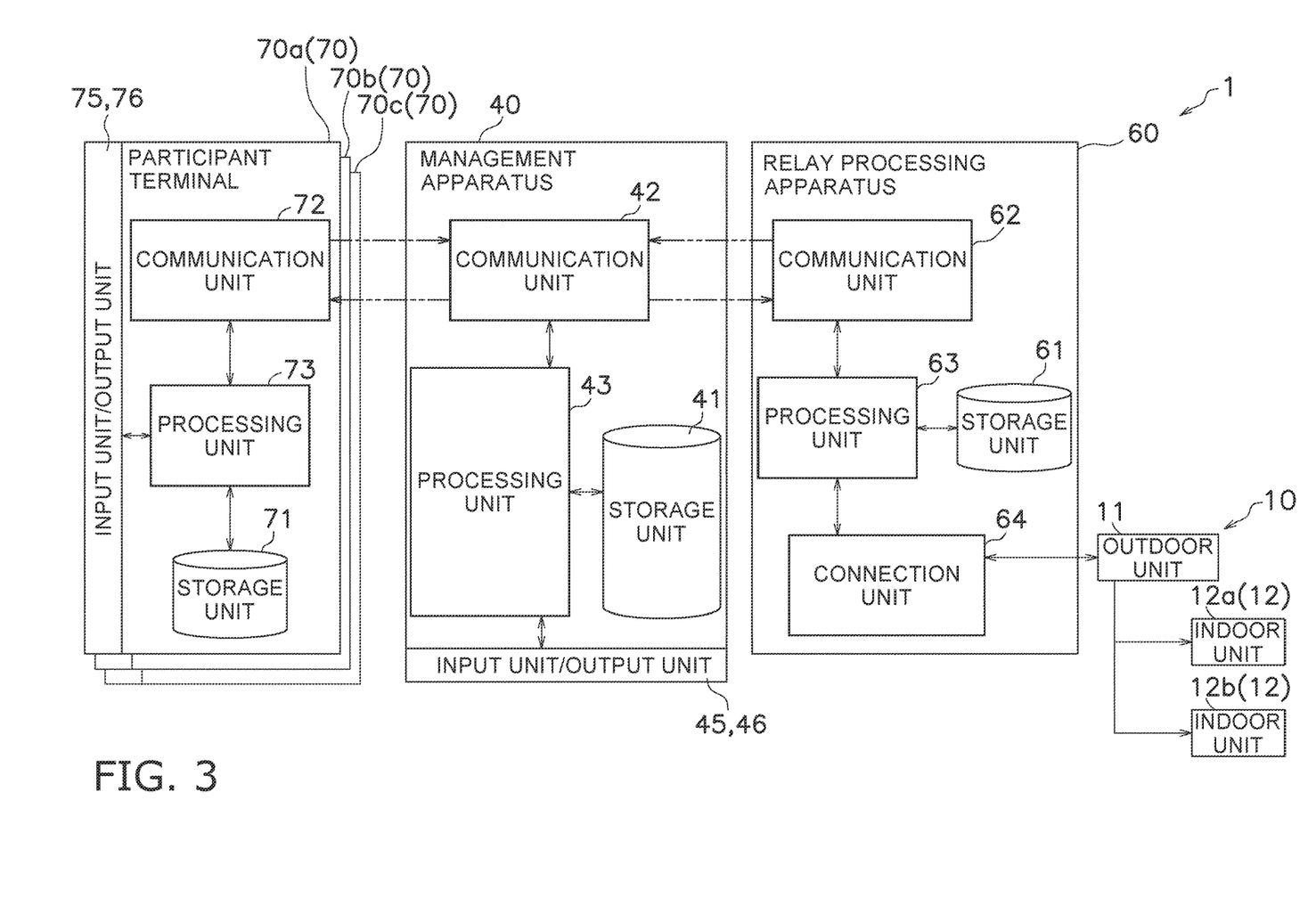
FIG. 3 is a schematic diagram illustrating functional blocks of each of apparatuses included in the device management system.

FIG. 3 is a schematic diagram illustrating functional blocks of each of the apparatuses included in the device management system 1.

(Relay Processing Apparatus)

The relay processing apparatus 60 is connected to the outdoor-unit control unit 11X of the outdoor unit 11 so as to control the air conditioner 10. The relay processing apparatus 60 is a computer for controlling the air conditioner 10 and is called an edge, for example. The relay processing apparatus 60 may be constituted by a plurality of computers or devices connected to each other via a network. The relay processing apparatus 60 includes a relay storage unit 61, a relay communication unit 62, a relay processing unit 63, and a relay connection unit 64.

The relay storage unit 61 stores various kinds of information and is constituted by a nonvolatile memory, a volatile memory, and so on. For example, the relay storage unit 61 stores a program for executing various functions of the relay processing apparatus 60. The relay storage unit 61 also stores, as a device data model, data of the devices (the outdoor unit 11 and the indoor units 12) serving as the management targets. Details of the device data model will be described later.

The relay communication unit 62 performs communication with the communication network 50. The function of the relay communication unit 62 enables data of the devices including various instructions to be communicated between the relay processing apparatus 60 and the management apparatus 40.

The relay processing unit 63 performs various kinds of processing. The relay processing unit 63 acquires data from the outdoor unit 11 and the indoor units 12 via the relay connection unit 64 and stores the data in the relay storage unit 61. The relay processing unit 63 causes the relay communication unit 62 to transmit, to the management apparatus 40 at a predetermined timing, the data acquired from the outdoor unit 11 and the indoor units 12. The relay processing unit 63 causes the relay communication unit 62 to transmit, to the outdoor unit 11 and the indoor units 12 at a predetermined timing, various instructions received from the management apparatus 40.

The relay connection unit 64 is a connection interface to the outdoor-unit control unit 11X. The relay processing apparatus 60 is capable of transmitting various instructions to the outdoor-unit control unit 11X via the relay connection unit 64 and is also capable of acquiring data from the outdoor-unit control unit 11X via the relay connection unit 64.

(Management Apparatus)

The management apparatus 40 is connected to the relay processing apparatus 60 and the participant terminals 70 via the communication network 50 so as to manage the air conditioner 10. The management apparatus 40 is a computer that manages the air conditioner and is, for example, a supercomputer, a workstation, a personal computer, or the like. The management apparatus 40 may be implemented by cloud computing. The management apparatus 40 includes a management storage unit 41, a management communication unit 42, a management processing unit 43, a management input unit 45, and a management output unit 46.

The management storage unit 41 stores various kinds of information and includes a ROM, a RAM, a hard disk, and/or the like. For example, the management storage unit 41 stores a program for executing various functions of the management apparatus 40. Similarly to the relay storage unit 61 of the relay processing apparatus 60, the management storage unit 41 stores, as a device data model, data of the devices (the outdoor unit 11 and the indoor units 12) serving as the management targets.

The management communication unit 42 is an interface for communicating with the relay processing apparatus 60 and the participant terminals 70. Specifically, the management communication unit 42 communicates data of the devices including various instructions with the relay processing apparatus 60. The management communication unit 42 receives a processing request from the participant terminals 70, and transmits a response to the processing request.

The management processing unit 43 performs various kinds of information processing in the management apparatus 40 and is constituted by a CPU, a cache memory, and so on. The management processing unit 43 causes the management storage unit 41 to store data of the devices (the outdoor unit 11 and the indoor units 12) serving as the management targets acquired from the relay processing apparatus 60. In response to a processing request from the participant terminal 70, the management processing unit 43 performs various kinds of processing including processing of reading data of the devices (the outdoor unit 11 and the indoor units 12) stored in the management storage unit 41 or processing of rewriting the data of the devices. In accordance with execution details of various kinds of processing, the management processing unit 43 causes the management communication unit 42 to transmit a response to the processing request to the participant terminal 70. In accordance with execution details of various kinds of processing, the management processing unit 43 causes the management communication unit 42 to transmit various instructions to the relay processing apparatus 60.

The management input unit 45 is an interface for inputting information to the management apparatus 40. For example, the management input unit 45 is implemented by a keyboard, a mouse, a touchscreen, and/or the like.

The management output unit 46 outputs various kinds of information and is constituted by a display, a speaker, or the like of various kinds.

(Participant Terminal)

The participant terminals 70 are terminals each of which is involved in management of devices (the outdoor unit 11 and the indoor units 12) and is used by an owner, an administrator, an operator, and/or the like. Herein, the term "managing" encompasses monitoring and operating. In the monitoring, data of the devices (the outdoor unit 11 and the indoor units 12) is received from the management apparatus 40 and is displayed. In the operating, various instructions are issued to the devices (the outdoor unit 11 and the indoor units 12) to cause the devices to perform desired operations.

The participant terminals 70 are connected to the management apparatus 40 via the communication network 50. The participant terminal 70 includes a participant storage unit 71, a participant communication unit 72, a participant processing unit 73, a participant input unit 75, and a participant output unit 76.

The participant storage unit 71 stores various kinds of information and includes a ROM, a RAM, a hard disk, and/or the like. For example, the participant storage unit 41 stores a program (external program) for performing various kinds of information processing.

The participant communication unit 72 is an interface for communicating with the management apparatus 40. Specifically, the participant communication unit 72 transmits a processing request to the management apparatus 40, and receives a response to the processing request.

The participant processing unit 73 performs various kinds of information processing in the participant terminal 70 and is constituted by a CPU, a cache memory, and so on. The participant processing unit 73 executes the program for performing various kinds of information processing stored in the participant storage unit 71. The participant processing unit 73 causes the participant communication unit 72 to transmit, to the management apparatus 40, a processing request generated in response to execution of a program relating to management of the devices (the outdoor unit 11 and the indoor units 12).

The participant input unit 75 is an interface for inputting information to the participant terminal 70. For example, the participant input unit 75 accepts an instruction such as an instruction for executing the program stored in the participant storage unit 71.

The participant output unit 76 outputs various kinds of information and is constituted by a displays, a speaker, or the like of various kinds. For example, the participant output unit 76 outputs data of the devices (the outdoor unit 11 and the indoor units 12) received by the participant communication unit 76.

(4) Device Data Model

Figure 4:
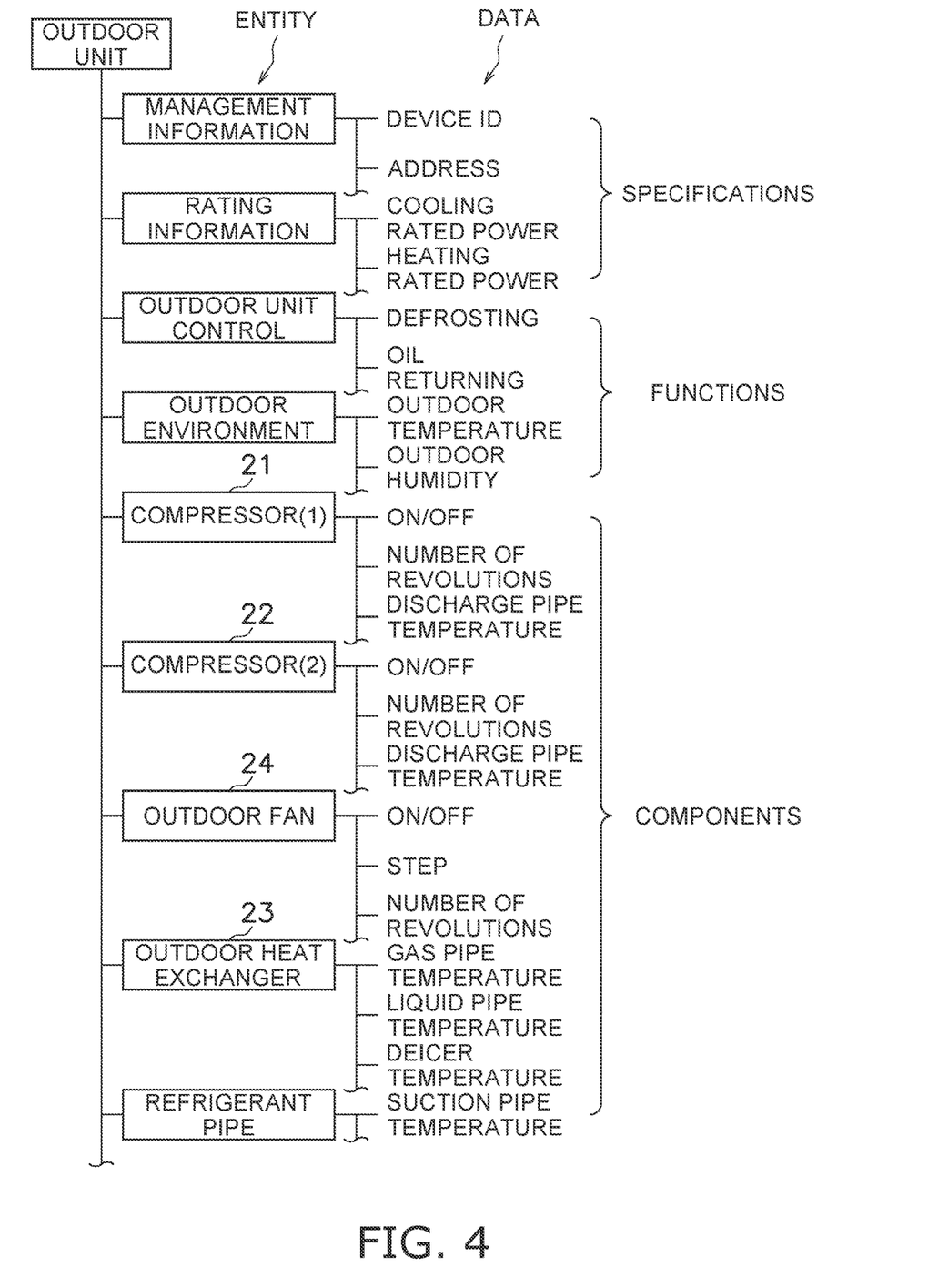
FIG. 4 is a schematic diagram illustrating a structure of a device data model (for an outdoor unit) handled by the device management system.
Figure 5:
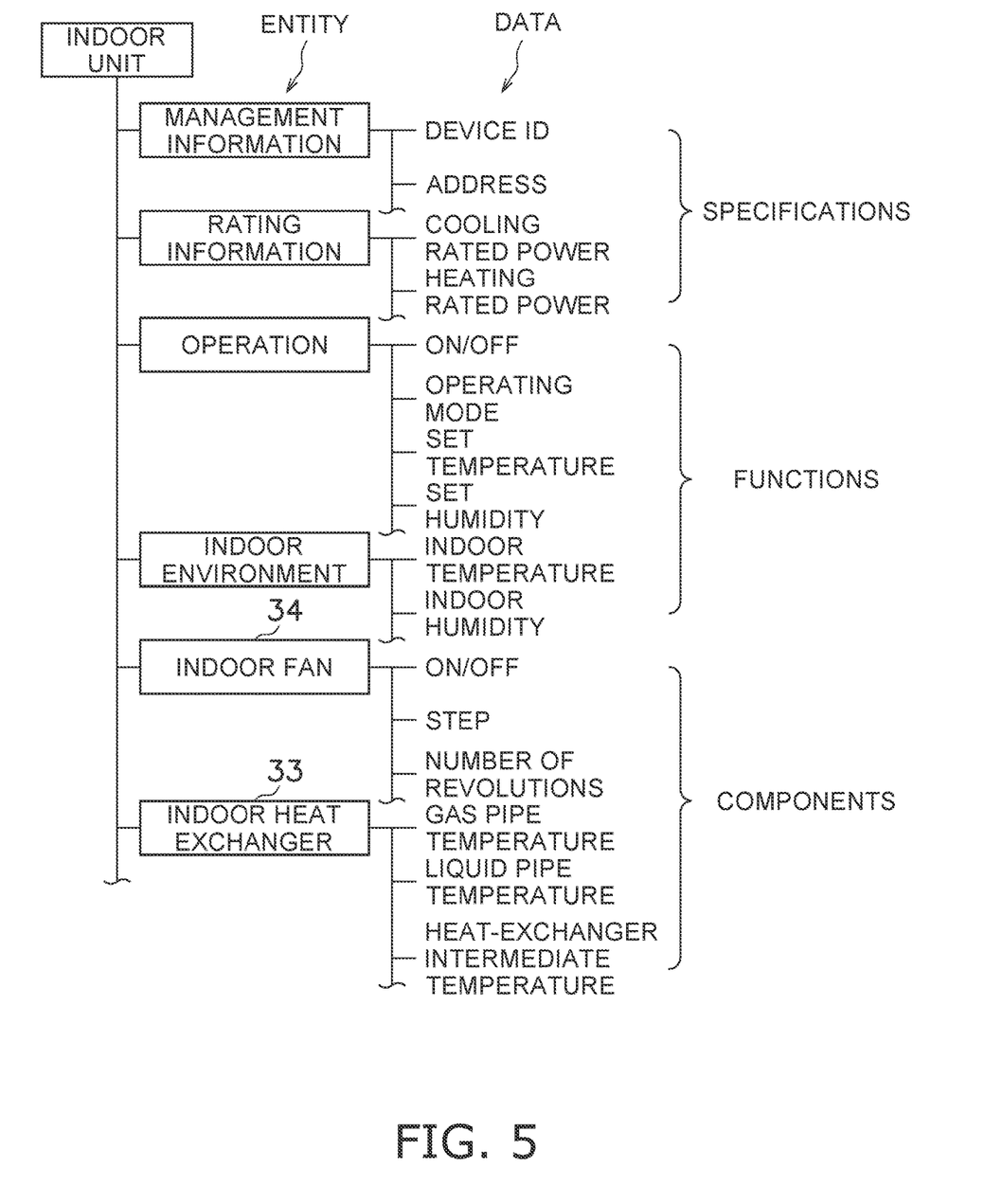
FIG. 5 is a schematic diagram illustrating a structure of a device data model (for an indoor unit) handled by the device management system.

FIG. 4 is a schematic diagram illustrating a structure of a device data model (for the outdoor unit 11) handled by the device management system 1. FIG. 5 is a schematic diagram illustrating a structure of a device data model (for the indoor unit 12) handled by the device management system 1.

The device management system 1 employs, as the device data model of the data of the devices (the outdoor unit 11 and the indoor units 12) serving as the management targets, a hierarchical structure in which for each of the devices, the data of the device is associated with at least one of information relating to a component of the device, information relating to a function of the device, and information relating to a specification of the device. The device management system 1 creates this device data model for each device capable of communicating with the management apparatus 40 and the relay processing apparatus 60, that is, for each device assigned a device ID or an address. In this embodiment, the device data model is created for each of the outdoor unit 11 and the indoor units 12a and 12b.

The device data model for the outdoor unit 11 will be described first.

The device data model for the outdoor unit 11 includes, as a layer associated with the outdoor unit 11, component entities, function entities, and specification entities.

The component entities are entities based on information relating to the components 21 to 24, etc. of the outdoor unit 11. For each of the components 21 to 24, etc., the component entity is associated with at least one of information (data) relating to the states of a corresponding component of the components 21 to 24 and information (data) relating to control of the corresponding component. In this embodiment, an outdoor heat exchanger entity is defined for the outdoor heat exchanger 23, an outdoor fan entity is defined for the outdoor fan 24, a compressor (1) entity is defined for the compressor 21, and a compressor (2) entity is defined for the compressor 22.

Figure 6:
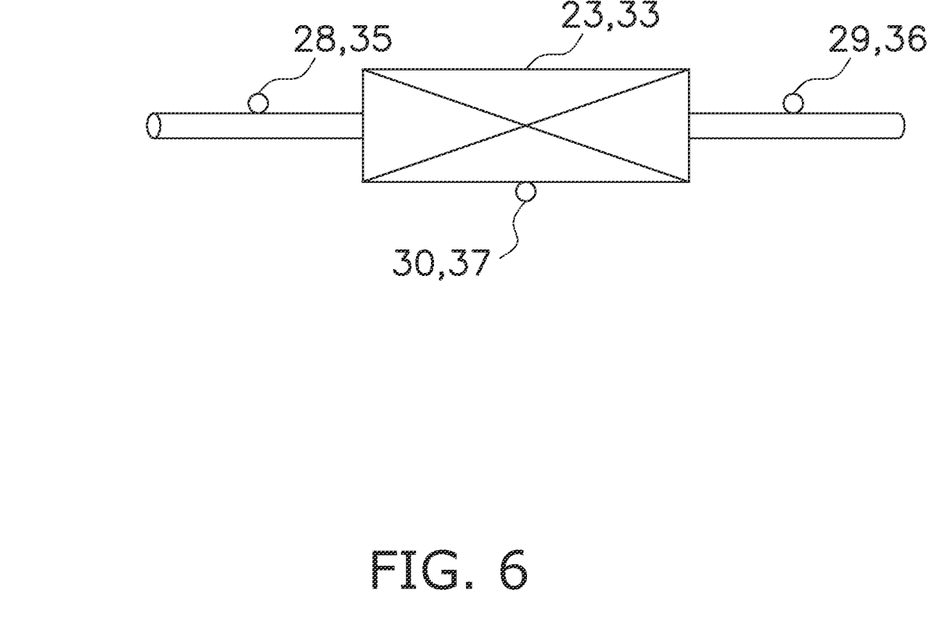
FIG. 6 is a schematic diagram illustrating sensors located near an outdoor heat exchanger and an indoor heat exchanger.

The outdoor heat exchanger entity is associated with a "gas pipe temperature", a "liquid pipe temperature", and a "deicer temperature" as the data relating to the states of the outdoor heat exchanger 23. The "deicer temperature" is a temperature detected by the temperature sensor 30 disposed at the outdoor heat exchanger 23 as illustrated in FIG. 6. Thus, the "deicer temperature" is associated with the outdoor heat exchanger entity. On the other hand, the "gas pipe temperature" and the "liquid pipe temperature" are temperatures respectively detected by the temperature sensors 28 and 29 that are not disposed at the outdoor heat exchanger 23 but are disposed at respective refrigerant pipes connected to the outdoor heat exchanger 23 as illustrated in FIG. 6. Thus, the "gas pipe temperature" and the "liquid pipe temperature" are not naturally associated with the outdoor heat exchanger entity. However, in this embodiment, the temperature sensors 28 and 29 disposed at the respective refrigerant pipes connected to the outdoor heat exchanger 23 are also associated with the outdoor heat exchanger entity similarly to the temperature sensor 30.

The outdoor fan entity is associated with a "step", a "number of revolutions", and so on as the data relating to the states of the outdoor fan 24 and with "on/off" and so on as the data relating to control of the outdoor fan 24.

Figure 7:
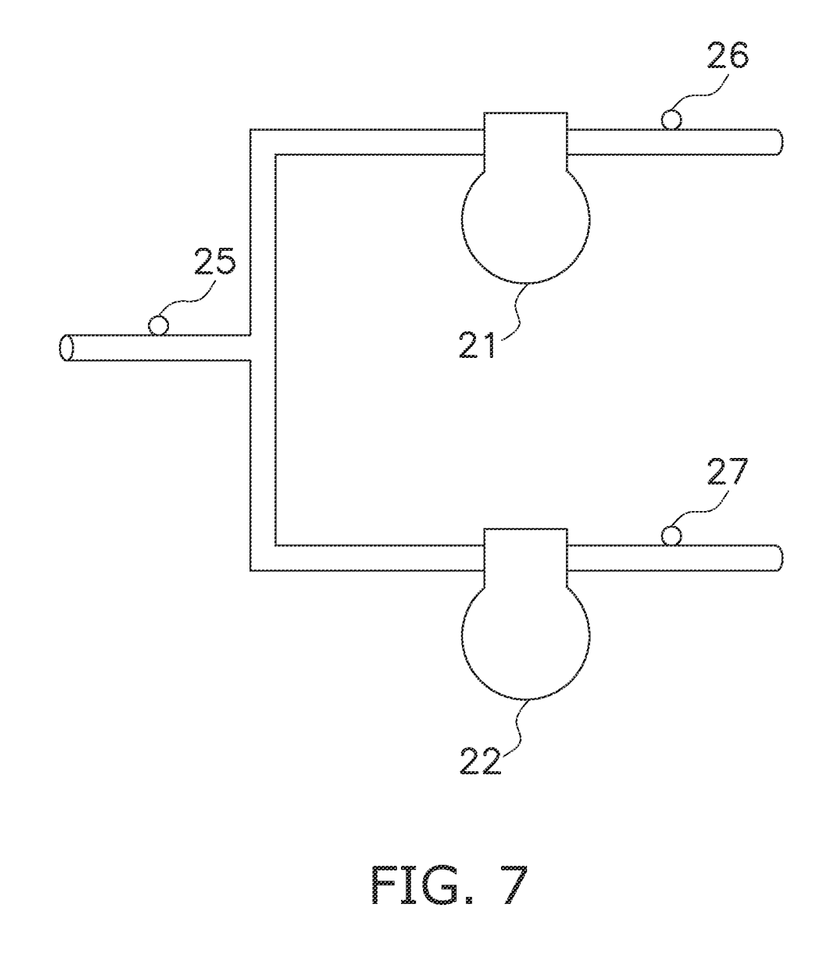
FIG. 7 is a schematic diagram illustrating sensors located near a compressor.

The compressor (1) entity is associated with "on/off" as the data relating to control of the compressor 21 and with a "number of revolutions" and a "discharge pipe temperature" as the data relating to the states of the compressor 21. The discharge pipe temperature is a temperature detected by the temperature sensor 26 disposed at a refrigerant pipe on the discharge side of the compressor 21 as illustrated in FIG. 7. Similarly to the "gas pipe temperature" and the "liquid pipe temperature" that are associated with the outdoor heat exchanger entity, the discharge pipe temperature is associated with the compressor (1) entity.

The compressor (2) entity is associated with "on/off" as the data relating to control of the compressor 22 and with a "number of revolutions" and a "discharge pipe temperature" as the data relating to the states of the compressor 22. The discharge pipe temperature is a temperature detected by the temperature sensor 27 disposed at a refrigerant pipe on the discharge side of the compressor 22 as illustrated in FIG. 7. Similarly to the "discharge pipe temperature" associated with the compressor (1) entity, the discharge pipe temperature is associated with the compressor (2) entity.

A "suction pipe temperature" is a temperature detected by the temperature sensor 25 disposed at a refrigerant pipe on the suction side of the compressors 21 and 22 as illustrated in FIG. 7. Thus, similarly to the "discharge pipe temperature", the "suction pipe temperature" is also to be associated with the compressor (1) entity and the compressor (2) entity. However, the temperature sensor 25 is disposed at the refrigerant pipe into which the refrigerant pipe on the suction side of the compressor 21 and the refrigerant pipe on the suction side of the compressor 22 are merged. That is, the outdoor unit 11 includes the temperature sensor 25 for use in common in control of the plurality of components (the compressors 21 and 22). In this case, the temperature sensor 25 shared by the compressors 21 and 22 is associated with another independent component. That is, the "suction pipe temperature" is not associated with the components (the compressors 21 and 22) in the component entity, but another component including the sensor 25 is defined. Thus, the temperature sensor 25 is associated with a refrigerant pipe entity as illustrated in FIG. 4. The refrigerant pipe entity is associated with the "suction pipe temperature" as the data relating to the state of the refrigerant pipe.

The function entities are entities based on information relating to functions of the outdoor unit 11. Each function entity is associated with at least one of information (data) relating to operations of the outdoor unit 11, information (data) relating to control of the outdoor unit 11, and information (data) relating to environment information measured by the outdoor unit 11. In this embodiment, an outdoor unit control entity and an outdoor environment entity are defined.

The outdoor unit control entity is associated with "defrosting", "oil returning", and so on as the data relating to control of the outdoor unit.

The outdoor environment entity is associated with an "outdoor temperature", an "outdoor humidity", and so on as the data relating to the outdoor environment. The "outdoor temperature" and the "outdoor humidity" are a temperature and a humidity respectively detected by the temperature sensor 31 and the humidity sensor 32 disposed at the outdoor unit 11.

The specification entities are entities based on information relating to specifications of the outdoor unit 11. Each specification entity is associated with at least one of information (data) relating to unique information of the outdoor unit 11, information (data) relating to identification information of the outdoor unit 11, and information (data) relating to installation information of the outdoor unit 11. In this embodiment, a management information entity and a rating information entity are defined.

The management information entity is associated with a "device ID", an "address", and so on as data relating to management information.

The rating information entity is associated with a "cooling rated power", a "heating rated power", and so on as data relating to rating information.

The device data model for the indoor unit 12 will be described next.

Similarly to that for the outdoor unit 11, the device data model for the indoor unit 12 includes, as a layer associated with the indoor unit 12, component entities, function entities, and specification entities.

The component entities are entities based on information relating to components 33, 34, etc. of the indoor unit 11. For each of the components 33, 34, etc., the component entity is associated with at least one of information (data) relating to the states of a corresponding component of the components 33 and 34 and information (data) relating to control of the corresponding component. In this embodiment, an indoor heat exchanger entity is defined for the indoor heat exchanger 33, and an indoor fan entity is defined for the indoor fan 34.

The indoor heat exchanger entity is associated with a "gas pipe temperature", a "liquid pipe temperature", a "heat-exchanger intermediate temperature", and so on as the data relating to the states of the indoor heat exchanger 33. The "heat-exchanger intermediate temperature" is a temperature detected by the temperature sensor 37 disposed at the indoor heat exchanger 33 as illustrated in FIG. 6. On the other hand, the "gas pipe temperature" and the "liquid pipe temperature" are temperatures respectively detected by the temperature sensors 35 and 36 that are disposed at respective refrigerant pipes connected to the indoor heat exchanger 33 as illustrated in FIG. 6.

The indoor fan entity is associated with a "step", a "number of revolutions", and so on as the data relating to the states of the indoor fan 34 and with "on/off" and so on as the data relating to control of the indoor fan 34.

The function entities are entities based on information relating to functions of the indoor unit 12. Each function entity is associated with at least one of information (data) relating to operations of the indoor unit 12, information (data) relating to control of the indoor unit 12, and information (data) relating to environment information measured by the indoor unit 12. In this embodiment, an operation entity and an indoor environment entity are defined.

The operation entity is associated with "on/off", an "operating mode", a "set temperature", a "set humidity", and so on as the data relating to operations of the indoor unit 12.

The indoor environment entity is associated with an "indoor temperature", an "indoor humidity", and so on as the data relating to the indoor environment. The "indoor temperature" and the "indoor humidity" are a temperature and a humidity respectively detected by the temperature sensor 38 and the humidity sensor 39 disposed at the indoor unit 12.

The specification entities are entities based on information relating to specifications of the indoor unit 12. Each specification entity is associated with at least one of information (data) relating to unique information of the indoor unit 12, information (data) relating to identification information of the indoor unit 12, and information (data) relating to installation information of the indoor unit 12. In this embodiment, a management information entity and a rating information entity are defined.

The management information entity is associated with a "device ID", an "address", and so on as data relating to management information.

The rating information entity is associated with a "cooling rated power", a "heating rated power", and so on as data relating to rating information.

Figure 8:
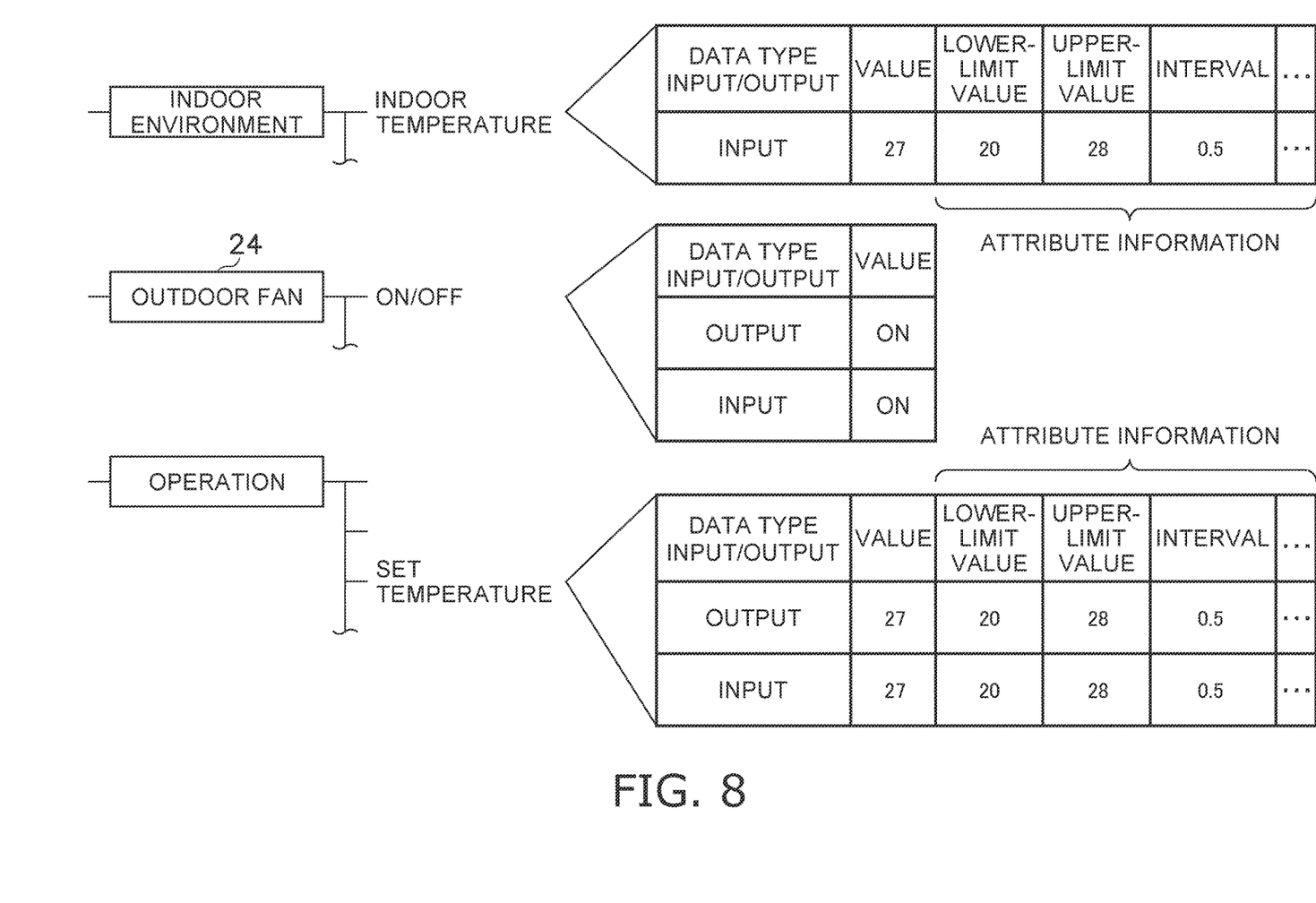
FIG. 8 is a schematic diagram illustrating a specific example of data (including data types and attribute information) on a device.

In the device data model described above, a data type is defined for each of the pieces of data of the devices (the outdoor unit 11 and the indoor units 12). Examples of the data type include a readable state value (Input) and a rewritable setting value (Output). Specifically, data detected by a sensor or the like has a readable state value alone as the data type. Such data is data that is not to be rewritten in response to a processing request or the like from the participant terminal 70 and thus is not rewritable. FIG. 8 illustrates the "indoor temperature" of the indoor environment entity. Data relating to operations, settings, and so on of the air conditioner 10 has a readable state value and a rewritable setting value as the data types. This is because such data is data that may be changed in response to a processing request or the like from the participant terminal 70. FIG. 8 illustrates the "on/off" of the outdoor fan entity and the "set temperature" of the operation entity.

In the device data model described above, attribute information is defined for each of the pieces of data of the devices (the outdoor unit 11 and the indoor units 12). Specifically, a lower-limit value, an upper-limit value, an interval, and so on are defined as the attribute information for the data. FIG. 8 illustrates the attribute information of the "indoor temperature" of the indoor environment entity and the attribute information of the "set temperature" of the operation entity, for which the lower-limit value is set to 20° C., the upper-limit value is set to 28° C., and the interval is set to 0.5° C.

(5) Features

Features of the device management system 1 will be described next.

(A)

A device management system of the related art employs, as a device data model, a flat structure in which all pieces of data are arranged at an equal level directly under a device. Thus, when accessing a piece of data in response to a processing request from an external program, the device management system needs to search all the pieces of data and thus takes some time to access the desired piece of data.

In contrast, the device management system 1 employs, as the device data model, the hierarchical structure described above (the hierarchical structure in which, for each device, data of the device is associated with at least one of information relating to a component of the device, information relating to a function of the device, and information relating to a specification of the device). Specifically, the device data model includes, as a layer associated with each of the devices (the outdoor unit 11 and the indoor units 12), at least one of a component entity, a function entity, and a specification entity (see FIGS. 4 and 5) as described above. Thus, when accessing a piece of data in response to a processing request from an external program (the participant terminal 70), the device management system 1 can first search for a corresponding entity and then search for the desired piece of data from pieces of data associated with the entity. As described above, the device management system 1 can reduce the number of pieces of search-target data by the entity search, and thus can access the desired piece of data more quickly than with the device data model of the related art having the flat structure. In addition, since a data access processing load can be suppressed, the use fee can also be suppressed in the case where cloud computing is used for implementing the management apparatus 40.

In addition, the device management system 1 employs the device data model having the hierarchical structure as described above and thus can access data in units of entities.

For example, in the case where the participant terminal 70 executes a program (external program) for compressor failure analysis, compressor failure prediction, or the like, an access to data of the compressors 21 and 22 is required. In relation to this, in the device management system 1, the device data model includes the compressor (1) entity collectively associated with pieces of data of the compressor 21 and the compressor (2) entity collectively associated with pieces of data of the compressor 22 (see FIG. 4). Thus, in response to a processing request for compressor failure analysis, compressor failure prediction, or the like, the device management system 1 can collectively access the pieces of data of the compressor (1) entity and the pieces of data of the compressor (2) entity.

In addition, in the case where the participant terminal 70 performs an operation of an indoor unit, scheduling control of the indoor unit, or the like, an access to data such as the on/off, the operating mode, and the set temperature of the indoor unit 12 is required. In relation to this, in the device management system 1, the device data model includes the operation entity collectively associated with pieces of data such as on/off, the operating mode, and the set temperature of the indoor unit 12 (see FIG. 5). Thus, in response to a processing request for an operation of an indoor unit, scheduling control of the indoor unit, or the like, the device management system 1 can collectively access the pieces of data of the operation entity.

The participant terminal 70 may restrict the access to pieces of data of the device data model depending on who the participant is (such as an owner, an administrator, an operator, and/or the like). In such a case, the access to the pieces of data of the device data model can be restricted in units of entities.

(B)

In the device data model of the device management system 1, the data type (Input, Output) is defined for each of the pieces of data of the devices (the outdoor unit 11 and the indoor units 12) as described above (see FIG. 8). Thus, the device management system 1 can allow a program (external program) executed by the participant terminal 70 to determine whether each of the pieces of data of the device data model is data for which an instruction can be given or data for which the state value can be acquired. Thus, the determination logic of the external program can be standardized.

Data (state value) having the data type "Input" can be subjected to reading processing performed by the management apparatus 40 (the management processing unit 43) in response to a processing request from an external program. The read data is then transmitted to the external program (the participant terminal 70). Data (setting value) having the data type "Output" can be subjected to rewriting processing performed by the management apparatus (the management processing unit 43) in response to a processing request from the participant terminal 70. The rewritten data is then transmitted as an instruction to the outdoor unit 11 or the indoor unit 12 via the relay processing apparatus 60.

In contrast, in terms of the data of the device data model of the related art, the data type is not defined for each of the pieces of data of the devices. Thus, it is not possible to determine from the device data model whether the data is data for which an instruction can be given or data for which a state value can be acquired. That is, such determination needs to be made with reference to a material such as a specification document of the device data model, which is very inconvenient.

As for the data of the device data model of the device management system 1, the data type is defined for each piece of data. By using this, it is possible to determine whether to a processing request from the participant terminal 70 is appropriate. Specifically, when rewriting of data having the state value (Input) alone as the data type is attempted in response to a processing request from the participant terminal 70, the management apparatus 40 transmits, to the participant terminal 70, information (an error signal) indicating that rewriting of the data is incorrect. Thus, for example, even if rewriting of the "indoor temperature" data is attempted in response to a processing request from the participant terminal 70, the management apparatus 40 can transmit an error signal to the participant terminal 70. As described above, by defining the data type for each of the pieces of data of the devices, the device management system 1 can inform an external program that there is a data type error in a processing request from the external program.

In addition, the data type is defined for each of the pieces of data of the device data model described above. By using this, it is possible to determine whether an instruction to the outdoor unit 11 or the indoor unit 12 from the participant terminal 70 is processed successfully. Specifically, in response to a processing request from the participant terminal 70, the setting value of data having the state value (Input) and the setting value (Output) as the data types is rewritten. The management apparatus 40 then transmits the rewritten setting value as an instruction to the outdoor unit 11 or the indoor unit 12. After transmitting the setting value to the outdoor unit 11 or the indoor unit 12, the management apparatus 40 waits for the state value corresponding to the setting value from the outdoor unit 11 or the indoor unit 12. If the management apparatus 40 does not receive the state value within a predetermined period since the transmission of the setting value to the outdoor unit 11 or the indoor unit 12, the management apparatus 40 transmits, to the participant terminal 70, information (an error signal) indicating that the setting value for the outdoor unit 11 or the indoor unit 12 has not been applied to the outdoor unit 11 or the indoor unit 12. Thus, for example, even if an instruction "on/off" is given to the outdoor unit 11 in response to a processing request from the participant terminal 70, the management apparatus 40 can determine that the instruction "on/off" is not processed successfully when the management apparatus 40 does not receive the state value within a predetermined period. As described above, by defining the data type for each of the pieces of data of the devices, the device management system 1 can inform an external program that an instruction regarding a setting value for the device from the external program is not processed successfully.

In addition, the device management system 1 employs the device data model in which the data type described above is defined and thus can access the data in units of data types. For example, in the case where a program that requires a state value alone for failure analysis or the like is executed, an access can be made to only data having the data type "Input".

(C)

In the device data model of the device management system 1, attribute information is defined for each of the pieces of data of the devices (the outdoor unit 11 and the indoor units 12) (see FIG. 8) as described above. Thus, the device management system 1 can allow a program (external program) executed by the participant terminal 70 to determine what setting value (instruction) and/or state value the data can have. Thus, the determination logic of the external program can be standardized.

Specifically, the attribute information is defined for each of the pieces of data of the device data model described above. By using this, it is possible to determine whether a processing request from the participant terminal 70 conforms to the attribute information of data. For example, if a processing request for changing the value of data to a value out of a range defined by the upper-limit value and the lower-limit value of the data is made from the participant terminal 70, the management apparatus 40 transmits, to the corresponding external program, information (an error signal) indicating that the processing request does not conform to the attribute information of the data for which the processing request is made. In addition, if the value of data transmitted from the management apparatus 40 to the participant terminal 70 by a processing request from the participant terminal 70 is a value out of the range defined by the upper-limit value and the lower-limit value, the value is determined to be an abnormal value. As described above, by defining the attribute information for each of the pieces of data of the devices, the device management system 1 can inform an external program whether a processing request from the external program conforms to the attribute information of the data.

(6) Modifications (A)

In the embodiment described above, devices serving as the management targets are the outdoor unit 11 and the indoor units 12 of the air conditioner 10. However, the devices serving as the management targets are not limited to these. For example, the devices serving as the management targets may be a ventilating apparatus, a hot water supply apparatus, a humidity control apparatus, an air handling unit, a variable air volume, a fan coil unit, a chiller unit, a boiler, and/or the like.

(B)

In the embodiment described above, the relay processing apparatus 60 is connected to the outdoor unit 11. However, the relay processing apparatus 60 may be built in the outdoor unit 11 and the indoor units 12. A communication apparatus such as a router for connecting the relay processing apparatus 60 to the communication network 50 may be built in the relay processing apparatus 60, the outdoor unit 11, and the indoor units 12 or may be disposed independently.

While the embodiment of the present disclosure has been described above, it should be understood that various modifications can be made on the configurations and details without departing from the gist and the scope of the present disclosure that are described in the claims.

The present disclosure is widely applicable to a device management system that manages devices.

What is claimed is:

1. A device management system that manages a device serving as a management target, the device being one or both of an outdoor unit and an indoor unit of an air conditioner, the device management system comprising:
   a storage unit including a memory that stores data of the device as a device data model having a hierarchical structure in which information relating to a plurality of components of the device is associated with the device; and
   a processor configured to, in response to a processing request from an external program, read or rewrite the data stored as the device data model in the storage unit,
   the device data model including, as a layer associated with the device, a component entity based on the information relating to a component of the plurality of components,
   for each component of the plurality of components, the component entity being associated with at least one of information relating to a state of the component, and information relating to control of the component,
   in a case in which the device includes a sensor usable in common in control of the plurality of components, information relating to the sensor is not associated with each of the components in the component entity but is associated with an independent component including the sensor.

2. The device management system according to claim 1, wherein
   for each of the components, the component entity is associated with information indicating a relationship between the components.

3. The device management system according to claim 1, wherein
   the device data model further includes a function entity as the layer associated with the device, the function entity being based on the information relating to a function of the device, and
   the function entity is associated with at least one of information relating to an operation of the device, information relating to control of the device, and information relating to environment information measured by the device.

4. The device management system according to claim 3, wherein
the function entity has the information relating to the operation of the device at an identical hierarchical level irrespective of a type of the device.

5. The device management system according to claim 1, wherein
the device data model further includes a specification entity as the layer associated with the device, the specification entity being based on the information relating to a specification of the device, and
the specification entity is associated with at least one of
information relating to unique information of the device,
information relating to identification information of the device, and
information relating to installation information of the device.

6. The device management system according to claim 1, wherein
the device data model defines attribute information for each piece of data of the device, and
in response to the processing request from the external program, the processing unit is configured to transmit, to the external program, information indicating whether the processing request conforms to the attribute information of the data for which the processing request is made.

7. A device management system that manages a device serving as a management target, the device being one or both of an outdoor unit and an indoor unit of an air conditioner, the device management system comprising:
a storage unit including a memory that stores data of the device as a device data model having a hierarchical structure in which information relating to a plurality of components of the device is associated with the device; and
a processor configured to, in response to a processing request from an external program, read or rewrite the data stored as the device data model in the storage unit,
the device data model defining a data type for each piece of data of the device,
the data type including a readable state value and a rewritable setting value, and
in a case in which rewriting of the data having the state value alone as the data type is attempted in response to the processing request from the external program, the processing unit being configured to transmit, to the external program, information indicating that rewriting of the data is incorrect.

8. The device management system according to claim 7, wherein
the device data model defines attribute information for each piece of data of the device, and
in response to the processing request from the external program, the processing unit is configured to transmit to the external program, information indicating whether the processing request conforms to the attribute information of the data for which the processing request is made.

9. A device management system that manages a device serving as a management target the device being one or both of an outdoor unit and an indoor unit of an air conditioner, the device management system comprising:
a storage unit including a memory that stores data of the device as a device data model having a hierarchical structure in which information relating to a plurality of components of the device is associated with the device; and
a processor configured to, in response to a processing request from an external program, read or rewrite the data stored as the device data model in the storage unit,
the device data model defining a data type for each piece of data of the device,
the data type including a readable state value and a rewritable setting value, and
the processing unit being configured to transmit the rewritable setting value to the device in a case in which the processing unit rewrites, in response to the processing request from the external program, the setting value of the data having the state value and the setting value as the data types, and
the processing unit being configured to transmit, to the external program, information indicating that the device has failed to operate in accordance with the setting value in a case in which the processing unit does not receive the state value corresponding to the setting value from the device within a predetermined period since the transmission of the setting value to the device.

10. The device management system according to claim 9, wherein
the device data model defines attribute information for each piece of data of the device, and
in response to the processing request from the external program, the processing unit is configured to transmit, to the external program, information indicating whether the processing request conforms to the attribute information of the data for which the processing request is made.

11. A device management system that manages a device serving as a management target, the device being one or both of an outdoor unit and an indoor unit of an air conditioner, the device management system comprising:
a storage unit including a memory that stores data of the device as a device data model having a hierarchical structure in which information relating to a plurality of components of the device is associated with the device; and
a processor configured to, in response to a processing request from an external program, read or rewrite the data stored as the device data model in the storage unit,
the device data model including, as a layer associated with the device, at least one of
a component entity based on the information relating to a component of the plurality of components,
a function entity based on the information relating to the function of the device, and
a specification entity based on the information relating to the specification of the device,
the device data model defining a data type for each piece of data of the device,
the data type including a readable state value and a rewritable setting value, and
in a case in which rewriting of the data having the state value alone as the data type is attempted in response to the processing request from the external program, the processing unit being configured to transmit, to the external program, information indicating that rewriting of the data is incorrect.

12. A device management system that manages a device serving as a management target, the device being one or both of an outdoor unit and an indoor unit of an air conditioner, the device management system comprising:

a storage unit including a memory that stores data of the device as a device data model having a hierarchical structure in which information relating to a plurality of components of the device is associated with the device; and a processor configured to, in response to a processing request from an external program, read or rewrite the data stored as the device data model in the storage unit, the device data model including, as a layer associated with the device, at least one of
- a component entity based on the information relating to a component of the plurality of components,
- a function entity based on the information relating to the function of the device, and
- a specification entity based on the information relating to the specification of the device, the device data model defining a data type for each piece of data of the device, the data type including a readable state value and a rewritable setting value, and the processing unit being configured to transmit the rewritable setting value to the device in a case in which the processing unit rewrites, in response to the processing request from the external program, the setting value of the data having the state value and the setting value as the data types, and the processing unit being configured to transmit, to the external program, information indicating that the device has failed to operate in accordance with the setting value in a case in which the processing unit does not receive the state value corresponding to the setting value from the device within a predetermined period since the transmission of the setting value to the device.

13. A device management system that manages a device serving as a management target, the device being one or both of an outdoor unit and an indoor unit of an air conditioner, the device management system comprising:

a storage unit including a memory that stores data of the device as a device data model having a hierarchical structure in which information relating to a plurality of components of the device is associated with the device; and a processor configured to, in response to a processing request from an external program, read or rewrite the data stored as the device data model in the storage unit, the device data model including as a layer associated with the device, at least one of
- a component entity based on the information relating to a component of the plurality of components,
- a function entity based on the information relating to the function of the device, and
- a specification entity based on the information relating to the specification of the device, the device data model including the component entity as the layer associated with the device, and for each of the components, the component entity being associated with at least one of
information relating to a state of the component, and information relating to control of the component, the device data model defining a data type for each piece of data of the device, the data type including a readable state value and a rewritable setting value, and in a case in which rewriting of the data having the state value alone as the data type is attempted in response to the processing request from the external program, the processing unit being configured to transmit, to the external program, information indicating that rewriting of the data is incorrect.

14. A device management system that manages a device serving as a management target, the device being one or both of an outdoor unit and an indoor unit of an air conditioner, the device management system comprising:

a storage unit including a memory that stores data of the device as a device data model having a hierarchical structure in which information relating to a plurality of components of the device is associated with the device; and a processor configured to, in response to a processing request from an external program, read or rewrite the data stored as the device data model in the storage unit, the device data model including, as a layer associated with the device, at least one of
- a component entity based on the information relating to a component of the plurality of components,
- a function entity based on the information relating to the function of the device, and
- a specification entity based on the information relating to the specification of the device, the device data model including the component entity as the layer associated with the device, and for each of the components, the component entity being associated with at least one of
information relating to a state of the component, and information relating to control of the component, the device data model defining a data type for each piece of data of the device, the data type including a readable state value and a rewritable setting value, and the processing unit being configured to transmit the rewritable setting value to the device in a case in which the processing unit rewrites, in response to the processing request from the external program, the setting value of the data having the state value and the setting value as the data types, and the processing unit being configured to transmit, to the external program, information indicating that the device has failed to operate in accordance with the setting value in a case in which the processing unit does not receive the state value corresponding to the setting value from the device within a predetermined period since the transmission of the setting value to the device.

* * * * *